United States Patent
Misaki et al.

[11] Patent Number: 6,151,983
[45] Date of Patent: Nov. 28, 2000

[54] CONDUIT FOR A CONTROL CABLE

[75] Inventors: Yoshio Misaki; Masahiro Yasui; Hideki Imai, all of Nagoya, Japan

[73] Assignee: Chuo Hatsujo Kabushiki Kaisha, Nagoya, Japan

[21] Appl. No.: 09/289,383

[22] Filed: Apr. 12, 1999

[30] Foreign Application Priority Data

Apr. 13, 1998 [JP] Japan ................................. 10-100758

[51] Int. Cl.⁷ ....................................................... F16C 1/26
[52] U.S. Cl. ............................................................. 74/502.5
[58] Field of Search ........................................... 74/502.5

[56] References Cited

U.S. PATENT DOCUMENTS

| | | | |
|---|---|---|---|
| 3,238,808 | 3/1966 | Barnard | 74/502.5 |
| 3,395,551 | 8/1968 | Morse | 74/502.5 X |
| 4,300,408 | 11/1981 | Yoshifuji | 74/502.5 |
| 5,161,427 | 11/1992 | Fukuda et al. | 74/502.4 |

FOREIGN PATENT DOCUMENTS

| | | |
|---|---|---|
| 43-1921 | 1/1968 | Japan . |
| 56-70117 | 6/1981 | Japan . |

*Primary Examiner*—Allan D. Herrmann
*Attorney, Agent, or Firm*—Morgan, Lewis & Bockius LLP

[57] ABSTRACT

In a conduit for a control cable, it is possible to ensure a good rigidity of a stranded portion 3A having a plurality of strand line elements 3 which are wound to an outer surface of the liner 2 without increasing a diameter (8.0 mm or less) of a conduit 1. In order to secure a greater polar moment of inertia of area, a combinatorial relationship between the number (N) of the strand line elements 3 and a diameter ($\phi$) of the strand line element 3 is selected from the following group A, B and C. Where A:=$\phi$=1.1~1.2 mm and N=13, B: $\phi$=1.2~1.35 mm and N=12, C: $\phi$=0.95~1.1 mm and N=14.

3 Claims, 4 Drawing Sheets

Fig. 2

| invention product | diameter (mm) | diameter of strand line element (mm) | number of strand line elements (N) | polar moment of inertia (mm⁴) | rupture strength at 130°C |
|---|---|---|---|---|---|
| A | φ7.5 | φ1.15 | 13 | 1.1160071 | 250kgf |
| B | φ7.8 | φ1.3 | 12 | 1.6823332 | 300kgf |
| C | φ7.5 | φ1.0 | 14 | 0.686875 | 170kgf |

Fig. 3

| comparative counterpart | diameter (mm) | diameter of strand line element (mm) | number of strand line elements (N) | polar moment of inertia (mm⁴) | rupture strength at 130°C |
|---|---|---|---|---|---|
| a | φ9 | φ0.8 | 24 | 0.4825344 | 132.7kgf |
| b | φ8.2 | φ0.8 | 20 | 0.4021112 | 112.7kgf |
| c | ↑ | φ0.884 | 17 | 0.5095832 | 137.6kgf |
| d | φ7.1 | φ0.7 | 19 | 0.2239251 | 70.5kgf |
| e | φ8.2 | φ0.7 | 21 | 0.2474962 | 75.5kgf |

CONDUIT FOR A CONTROL CABLE

BACKGROUND OF THE INVENTION

Field of the Invention

The invention relates to a conduit (called also as "outer cable") for a control cable which is improved to impart a good rigidity without increasing a diametrical dimension thereof.

In control cables (e.g., gear shift cable or select cable) used for a vehicular automatic transmission, they are used in a engine compartment under a high ambient temperature (e.g., 100° C. or greater). In order to cope with the high ambient temperature, it is of importance to consider a heat resistant property and heat resistant strength when selecting a material for a jacket. To compensate the heat resistant property and heat resistant strength, a heat endurable material has been used for the jacket. Alternatively, a reinforcement is added to the jacket as disclosed by Japanese patent publication No. 43-1921 and laid-open Japanese patent application No. 56-70117).

However, adding the reinforcement and providing the heat endurable material invites a higher price of the end product.

Therefore, the present invention has made with the above drawbacks in mind, it is a main object of the invention to provide a conduit for a control cable which is capable of improving a heat resistant strength without inviting a higher price of the product.

SUMMARY OF THE INVENTION

According to the present invention, there is provided a conduit for a control cable in which the conduit has an outer diameter of 8.0 mm or less, and a combinatorial relationship between the number (N) of strand line elements and a diameter ($\phi$) of the strand line element is selected from the following group A, B and C:

A: $\phi=1.1\sim1.2$ mm and N=13,
B: $\phi=1.2\sim1.35$ mm and N=12,
C: $\phi=0.95\sim1.1$ mm and N=14.

When comparing a rigidity of the stranded portion to that of the jacket against a rupture strength, the rigidity of the stranded portion contributes more than the rigidity of the jacket does with the increase of the ambient temperature. That is to say, it is advantageous to dominate the rigidity of the stranded portion more than the rigidity of the jacket in order to efficiently improve the heat resistant strength under the high ambient temperature.

When adopting the conduit of 8.0 mm in diameter or less, the combinatorial relationship between the number (N) of the strand line elements and the diameter ($\phi$) of the strand line element is selected from the group A, B and C.

This makes it possible to closely arrange the strand line elements on an outer surface of the liner element so as to ensure a higher geometrical moment of inertia of the stranded portion when compared to an equivalent conduit having the same diameter.

With the strand line elements made of a material selected from a hard steel wire, oil-tempered wire, piano wire or stainless steel wire, while the jacket is made of a thermoplastic material such as polypropylene and polyamide, it is possible to improve the heat resistant strength of the conduit without inviting a higher price of the product because these thermoplastic materials have been commonly used and does not particularly entail an increase of cost.

BRIEF DESCRIPTION OF THE DRAWINGS

A preferred form of the present invention is illustrated in the accompanying drawings in which:

FIG. 2 shows detail of the conduit produced on the basis of invention products;

FIG. 3 shows detail of the conduit produced on the basis of comparative counterparts.

DETAILED DESCRIPTION OF THE PREFERRED EMBODIMENTS

Figure 1:
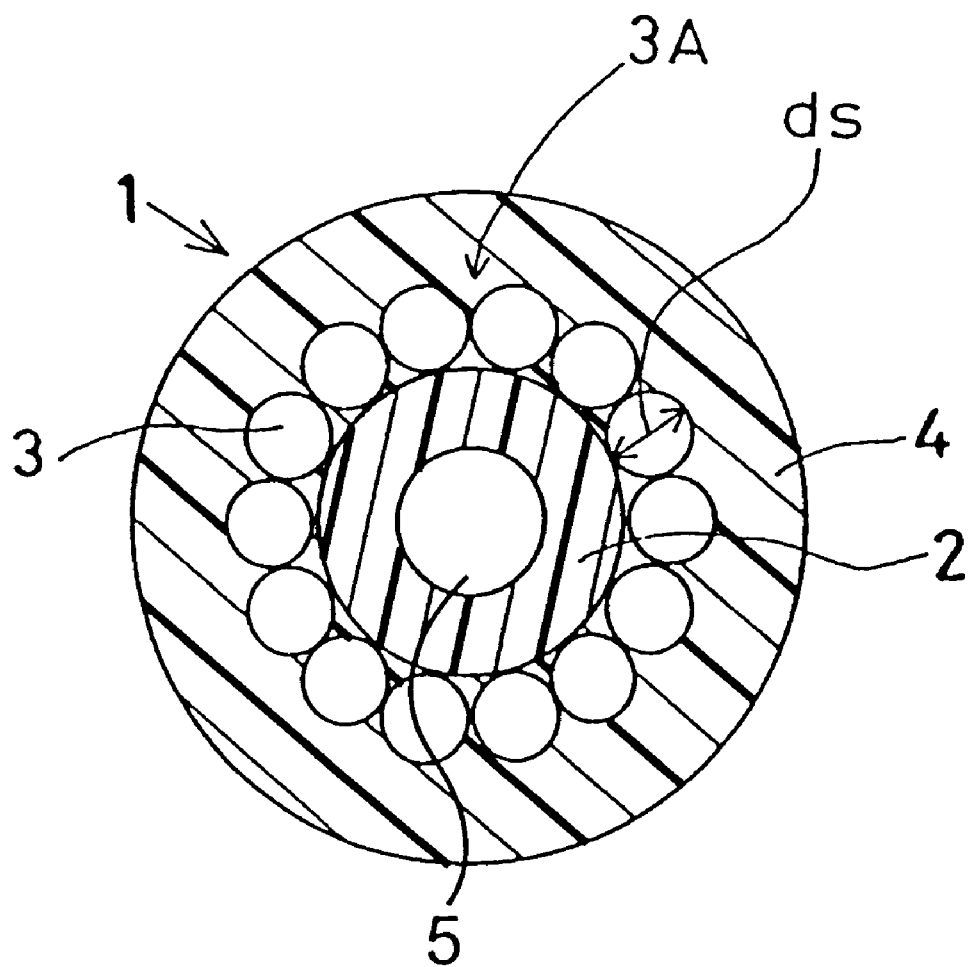
FIG. 1 is a latitudinal cross sectional view of a conduit and FIG. 1a is a perspective view of the conduit according to an embodiment of the invention.
Figure 1A:
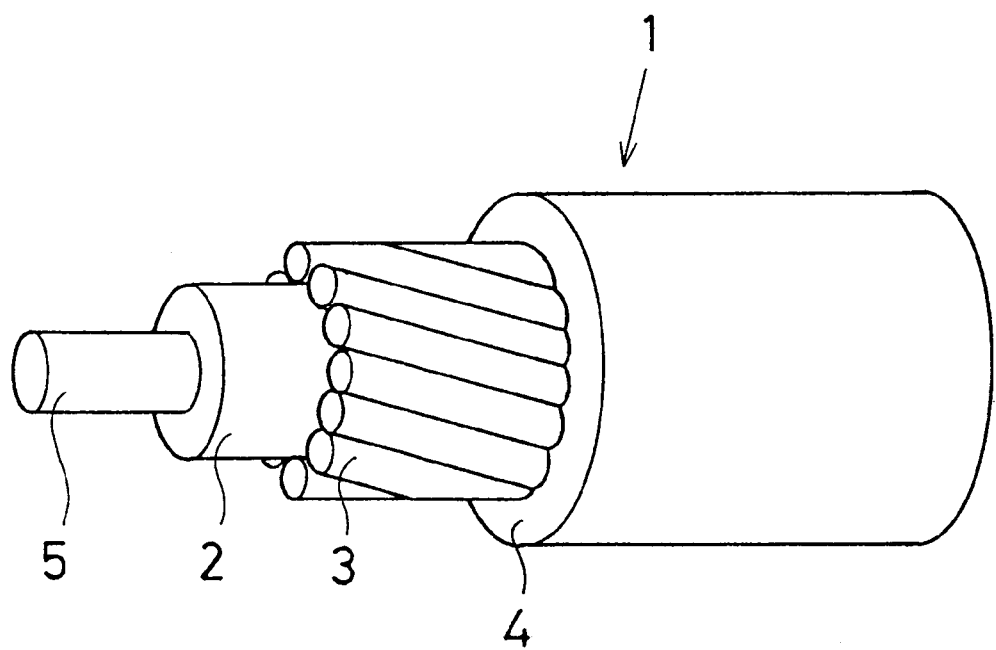

Referring to FIG. 1 which shows a conduit 1 according to an embodiment of the present invention, the conduit 1 is used to a control cable of a vehicular transmission by way of illustration. The conduit 1 has a liner 2 arranged to axially move along an inner cable 5. Around an outer surface of the liner 2, a plurality of strand line elements 3 are wound to form a stranded portion 3A. (see FIG. 1a) A jacket 4 is provided to encase an outer surface of the stranded portion 3A in the manner to conceal the stranded portion 3A.

In the present embodiment of the invention, attention has been focused to a rigidity of the stranded portion 3A which seems to contribute to the strength of the conduit 1. Without increasing the diametrical dimension of the conduit 1, the procedures have been established to enhance the rigidity of the stranded portion 3A in relation to the number (N) of the strand line elements 3 and a diameter ($\phi$) of the strand line element 3.

In addition to the rigidity of the stranded portion 3A, a rigidity of the jacket 4 may be considered in relation to the strength of the conduit 1. However, the proportion that the rigidity of the jacket 4 contributes to the strength of the conduit 1 seems to become significantly smaller with the rise of the ambient temperature, considering that the jacket 4 is commonly made of a plastic material.

With this in mind, enhancing the rigidity of the jacket 4 is out of the consideration as a measure to improve the heat resistant strength of the conduit 1 in the present invention.

Considering that an inner diameter of the liner 2 is determined by an inner cable passing inside the liner 2 and that an outer diameter of the liner 2 is restricted by manufacturing conditions, a rigidity of the liner 2 is not taken into account. This is even because the rigidity of the liner 2 contributes to the strength of the conduit 1 less than that of the jacket 4 does.

In order to establish the optimum rigidity of the stranded portion 3A, various sorts of experimental tests have been carried out in relation to the rupture strength of the conduit 1.

As a result, as long as the diametrical dimension of the conduit is of 8.0 mm in diameter or less, the procedures is established to closely arrange the strand line elements 3 on an outer surface of the liner 2 so as to ensure a higher polar moment of inertia of area at the stranded portion 3A when compared to an equivalent conduit having the same diameter. In this instance, the diametrical dimension of the conduit 1 is designated to be 8.0 mm or less in order to keep the conduit 1 thin.

The polar moment of inertia of area (Is) is determined by the following formula.

$$Is = (\pi \cdot ds^4/64) \times N$$

Where (ds) represents a diameter of the strand line element 3, (N) represents the number of the strand line elements 3.

The experimental test results show that a combinatorial relationship between the number (N) of strand line elements 3 and a diameter (φ) of the strand line element 3 is selected from the following group A, B and C:

A: φ=1.1~1.2 mm and N=13,
B: φ=1.2~1.35 mm and N=12,
C: φ=0.95~1.1 mm and N=14.

Comparative counterparts were selected to compare with the conduit 1 defined within the group A, B and C in terms of the rupture strength at 130° C.

The detail concerning to the present conduit 1 and the comparative counterparts are shown by FIGS. 2 and 3.

In this instance, the materials used to the liner 2, strand line element 3 and jacket 4 in the present invention are the same as commonly used conventionally.

The liner 2 is made of a thermoplastic material including polybutyleneterephthalate, PTFE or the like.

The strand line element 3 is made of a material such as a hard steel wire, oil-tempered wire, piano wire or stainless steel wire.

To the jacket 4, a thermoplastic material such as polypropylene or polyamide is used.

Figure 4:
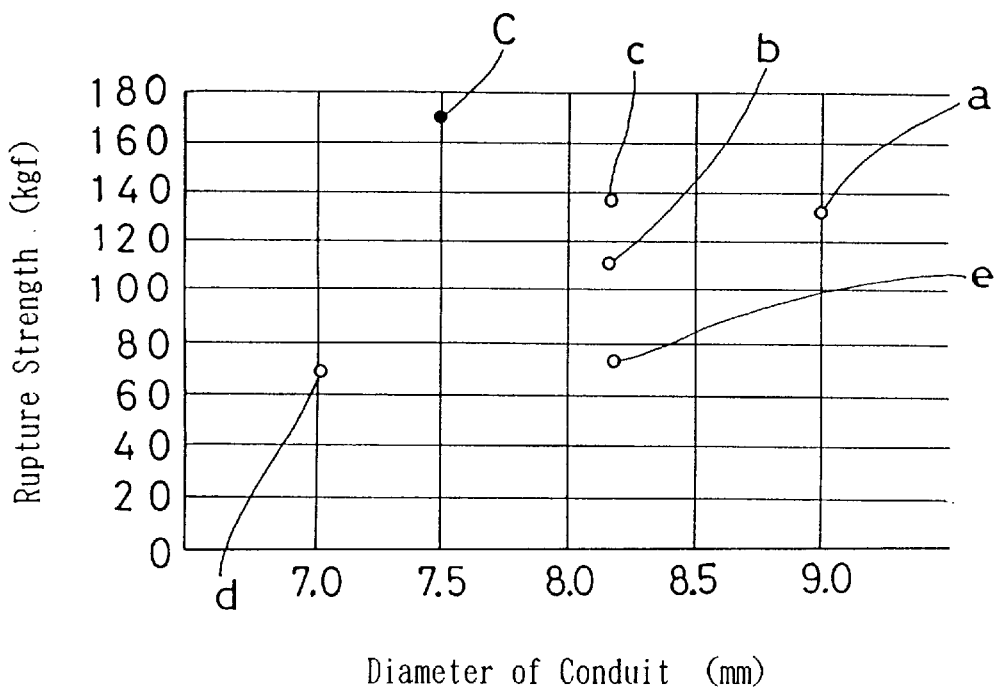
FIG. 4 is a graphical representation showing a relationship between an outer diameter of a jacket and a rupture strength.

In terms of the rupture strength, each of the invention products shows higher values than the comparative counterparts as shown in FIG. 4.

In terms of the polar moment of inertia of area, FIGS. 2 and 3 show higher rupture strengths with the increase of the polar moment of inertia of area.

By increasing the polar moment of inertia of area at the stranded portion 3A, it is possible to improve the heat resistant strength (rupture strength) of the conduit 1. In the comparative counterparts in which the reinforcement is added, otherwise the heat resistant jacket is used, they are short of the technological idea to improve the heat resistant strength by altering the detail of the stranded portion 3A, but they are secondarily designing the stranded portion based on diameters of the existing conduit and liner. This may be surmised by the fact that the comparative counterparts exhibit smaller polar moments of inertia of area even when diameters of comparative counterparts are greater than those of the conduits 1.

As understood from the foregoing description, when adopting the conduit 1 of 8.0 mm in diameter or less, the combinatorial relationship between the number (N) of the strand line elements 3 and the diameter (φ) of the strand line element 3 is selected from the group A, B and C.

This ensures a higher heat resistant strength at the conduit 1 when compared to an equivalent conduit having the same diameter. This eliminates the necessity of adding the reinforcement or providing the higher heat resistant material with the jacket 4, and thus resultantly reducing the price of the product.

It is to be noted that the geometrical moment of inertia includes the polar moment of inertia of area because the terms of the moment changes depending on a cross sectional shape of the strand line elements 3 of the stranded portion 3A.

While there has been described what is at present thought to be preferred embodiments of the invention, it will be understood that modifications may be made therein and it is intended to cover in the appended claims all such modifications which fall within the scope of the invention.

What is claimed is:

1. A conduit for a control cable comprising:

a liner member provided to axially move along an inner cable therein;

a stranded portion, having a plurality of strand line elements, winding to surround an outer surface of said liner member;

a jacket provided to encase said stranded portion therein;

said conduit having an outer diameter of 8.0 mm or less;

a combinatorial relationship between the number (N) of said strand line elements and a diameter (φ) of said strand line element being selected from the following group A, B and C:

A: φ=1.1~1.2 mm and N=13,
B: φ=1.2~1.35 mm and N=12,
C: φ=0.95~1.1 mm and N=14.

2. A conduit for a control cable as recited in claim 1, wherein said strand line elements are made of a material selected from the group consisting of a hard steel wire, oil-tempered wire, piano wire and stainless steel wire, while said jacket is made of a thermoplastic material including polypropylene and polyamide.

3. A conduit for a control cable as recited in claim 1, wherein said control cable is used for a vehicular transmission.

* * * * *